United States Patent
Raheman

(10) Patent No.: US 7,228,424 B2
(45) Date of Patent: Jun. 5, 2007

(54) METHOD AND SYSTEM FOR USING OPTICAL DISK DRIVE AS A BIOMETRIC CARD READER FOR SECURE ONLINE USER AUTHENTICATION

(75) Inventor: Fazal Raheman, Nagpur (IN)

(73) Assignees: Mossman Associates Inc, Blackstone, MA (US); IQ Infosystems Pvt. Ltd, Nagpur (IN)

( * ) Notice: Subject to any disclaimer, the term of this patent is extended or adjusted under 35 U.S.C. 154(b) by 818 days.

(21) Appl. No.: 10/216,965

(22) Filed: Aug. 12, 2002

(65) Prior Publication Data

US 2004/0030925 A1  Feb. 12, 2004

(51) Int. Cl.
  *H04L 9/00* (2006.01)
(52) U.S. Cl. ............... 713/172; 713/184; 713/185; 713/186; 726/3; 726/9; 726/20; 369/24.01; 369/26.01
(58) Field of Classification Search ............ 726/9, 726/20, 3; 713/184, 185, 172, 186; 369/24.01, 369/26.01
  See application file for complete search history.

(56) References Cited

U.S. PATENT DOCUMENTS

| | | | | |
|---|---|---|---|---|
| 5,689,561 A | * | 11/1997 | Pace | ............ 705/55 |
| 5,949,882 A | * | 9/1999 | Angelo | ............ 713/185 |
| 6,035,398 A | * | 3/2000 | Bjorn | ............ 713/186 |
| 6,061,656 A | * | 5/2000 | Pace | ............ 705/1 |
| 6,173,400 B1 | * | 1/2001 | Perlman et al. | ............ 713/172 |
| 6,738,901 B1 | * | 5/2004 | Boyles et al. | ............ 713/159 |
| 6,871,278 B1 | * | 3/2005 | Sciupac | ............ 713/185 |
| 6,877,096 B1 | * | 4/2005 | Chung et al. | ............ 713/185 |
| 2002/0138765 A1 | * | 9/2002 | Fishman et al. | ............ 713/201 |
| 2003/0105970 A1 | * | 6/2003 | Pei Jen | ............ 713/200 |

\* cited by examiner

*Primary Examiner*—Kim Y. Vu
*Assistant Examiner*—Beemnet W Dada

(57) ABSTRACT

The invention describes a novel method for securing authentic client access to online confidential resources by means of a physical hard key/card device, which does not need a custom card reader, but uses the optical disc drive of any remote computer to conduct a highly secure online transaction on the Internet. Such real online card key (ROCK) device can be read by an optical disc drive of a computer, without allowing any of the file viewing, copying and editing functions. Such ROCK device can be used as a real world physical hard key for accessing secured networks and conducting secure online transactions. It can also be used as a fully functional versatile credit card with additional magnetic stripe and manual authentication methods available on the non-reflective surface of the optical disc based ROCK optical disc card of the present invention.

15 Claims, 5 Drawing Sheets

METHOD AND SYSTEM FOR USING OPTICAL DISK DRIVE AS A BIOMETRIC CARD READER FOR SECURE ONLINE USER AUTHENTICATION

CROSS-REFERENCE TO RELATED APPLICATIONS

Not applicable

Statement Regarding Federally Sponsored Research or Development

Not applicable

Reference to a Microfiche Appendix

Not applicable

BACKGROUND OF THE INVENTION

Internet is the fastest growing medium in history. Internet revolution really took off in 1994, when the first commercially available Web browser, Netscape Navigator 1.0, was released (November 1994). The Web browser became a user-friendly interface to access the information located on a worldwide network of computers from any remote computer. This graphical user interface converted the Internet into a World Wide Web. The global Internet user population continues to grow exponentially. It is projected that by the year 2002, 800 million users will be surfing the Web. Businesses are moving faster than ever to this brand new Internet medium. The Internet demographics are a marketers dream. Net users are young, well educated and earn high incomes. E-commerce is fast emerging as the wave of the future. Major consumer companies are adapting their businesses to e-commerce. Banking transactions on the Internet are fast catching up. Corporate houses are creating Intranets, Extranets and Virtual Private Networks (VPNs) to make their databases available to their employees and select clients to maximise productivity.

As much as the Internet is growing, the use of Web Applications for remote data access is increasing. With the increase in use of Web Applications, concerns for security on the Internet are growing. Today's Internet security practices are not enough to stop Web Application intrusion or prevent hackers from stealing digital property—from sensitive customer data to confidential corporate information. Hacking a user ID and password or a credit card details, while the user enters the information on the Web, is not a very difficult proposition for an expert hacker. Security concerns are hurdles to the growth of online transactions.

As companies worldwide sell their products and services to consumers over the Internet, the business-to-consumer electronic-commerce market is expected to jump to $380 billion in 2003, up from an estimated $31.2 billion in 1999. Having learned from the experiences of their U.S. counterparts, more and more "brick and mortar" retailers around the world are beginning to sell their wares online. In 2003, the U.S. market is expected to be $147 billion, less than half of the expected worldwide total. A lot of that non-U.S. growth will occur in Europe, where online sales to consumers are expected to grow from $5.4 billion in 1999 to more than $115 billion in 2003.

E-Commerce has been a major thrust behind the proliferation of the Internet, particularly the World Wide Web. This has led to the integration of traditional payment methods into Internet-related technologies, particularly to be used over the Web.

Credit card frauds are on the rise. This is primarily on account of the online transactions. The familiar plastic currency was designed to be physically handed over to merchants, who could at least make a cursory check to see if signatures on the card and the sales slip matched. Online, commerce is anonymous. There is no way to see who's entering the credit card numbers on the Web page, an anonymity that heavily favours the fraud artists. The stakes are higher for merchants than consumers. While consumers face a limited liability of $50 and a paperwork hassle, online merchants must write off credit card theft as "acceptable loss." Hard data on how bad losses are, is impossible to find, but anecdotally some industries relate fraud rates as high as 40 percent. Merchants use inexact software to filter out potential fraudulent purchases, but that means they turn away legitimate sales, too.

One can classify credit card payment on online networks into following categories:

1. Payment using plain credit card information—The easiest method of payment is the exchange of (unencrypted) credit cards over a public network such as telephone lines or the Internet. The low level of security inherent in the design of the Internet makes this method problematic. Authentication is also a problem as the merchant is usually responsible to ensure that the person using the credit card is its owner.
2. Payment using encrypted credit card information—Encrypting credit card information is a solution to the problems inherent in 1. However, one concern here is the cost of the transaction itself, which could prohibit low-value payments (micropayments).
3. Payment using third-party verification—One solution to security and verification problems in the introduction of a third-party, such a company that collects and approves payments from one client to another. After a certain period of time for processing, one credit card transaction for the total accumulated amount is completed.

Traditional cryptography has usually involved the creation and sharing of a secret key for the encryption and decryption of messages. This secret or private key system has the significant flaw that if the key is discovered or intercepted by someone else, messages can easily be decrypted. For this reason, public key cryptography and the public key infrastructure (PKI) has been the preferred approach for a very high security need on the Internet. However PKI is only practicable in a limited use Intranet scenario, for a very high security classified access, on account of its limitation in economy and convenience of execution on a mass scale. Moreover such keys are software algorithms, ensuring no guarantee that the user is authentic user. A hard key ensures highest level of security. However the architecture of the present day PCs does not provision the use of a user specific hard key for online transactions.

Several technologies hope to discourage the thieves by implementing systems that require some real-world physical component when shopping online. Smart cards, the generic term for any plastic which includes an embedded microchip, are one promising solution. Such smart cards encode the biometric data related to the user. Smart cards, which identify the user through encrypted information embedded on the chip, must be inserted into a "card reader" attached to the computer. That means the card can't be used for e-commerce unless the purchaser is currently holding it, and has a card reader device to read it. A PIN number is also required, so a thief needs to physically have the card and a security code in order to use it. That's a hurdle for an unauthorized user, more difficult one than using "a number and a date."

Furthermore, any smart card-based system will cost significantly more than the current magnetic stripe card systems currently in place. A PIN smart card costs perhaps $3, and a biometric smart card will cost $5. In addition, each station that currently accepts existing cards would need a smart card reader, and if live biometrics are required, a biometric scanner will also have to be attached to the reader as well.

It is envisioned that in addition to storing credit and debit account numbers and biometric or PIN authentication information, smart cards may also store phone numbers, frequent flyer miles, coupons obtained from stores, electronic cash usable at tollbooths and on public transit systems, as well as the users name, vital statistics, and perhaps even medical records.

Still, smart cards are 20 years old, and while there have been some level of adoption in Europe, trials of the technology in the U.S. have failed repeatedly. Consumers perceived them as inconvenient, and in the past they have been unmoved by the improvement in security. The costly price tag warrants the developers to look for additional applications of the smart card beyond simple banking and debit needs. Obviously, every consumer will not be willing to buy a card reader. However every computer these days comes with a 3.5 floppy drive and an Optical Disk Drive (ODD) such as CD ROM/DVD drive, as standard. These are the data input devices, which cannot be normally used for reading a smart card, because they allow viewing, copying and editing of the source data files.

Although user authentication using a hard key or a smart card will ensure secure transactions on the Web, it is not practical for every user to have a reading device to enable these chip based biometric approaches. And it is not an economically viable proposition for the credit card industry to instantly replace the current magnetic stripe cards by smart cards, which have a several fold higher price tag. Hence, in spite of known security protocols, intrusion is easily possible for an experienced hacker by using any Web browser.

BRIEF SUMMARY OF THE INVENTION

The embodiments of present invention describe a novel approach for a real online hard key or a smart card based user authentication device, which does not require the use of a special reading device. Such a Real Online Card Key (ROCK) system utilizes the standard Optical Disk Drive (ODD), and converts it into a ROCK reading device. After the completion of the online transaction, the system restores all of the ODD functions without making any changes to the system files. Accordingly, it is a primary object of the invention to prevent intrusion of unauthorised users into a Web Application. It is also an object of the invention to secure online transactions on the Web.

It is also another object of the invention to secure confidentiality of the data on the Web. It is yet another object of the invention to enable convenient hardware key-based user access authentication system for online PC transactions. It is still another object of the invention to eliminate the use of an external card reading device for reading the user specific hard key or smart cards.

It is yet another object of the invention to use the ODD device of a PC as the card reading device. It is also an object of the invention to prevent data copy or transfer from the card to the host PC memory storage devices.

It is also another object of the invention to create a very secure online session for the authorized user by generating dynamic 12 digit PIN based on the client location, current time, card serial number and card creation date.

It is also another object of the invention to provide a higher data handling capability than a chip based smart card at a cost significantly lower than the magnetic stripe cards.

It is yet another object of the invention to store and manage not only multiple financial account information, but personal information like phone numbers, frequent flyer miles, coupons obtained from stores, electronic cash usable at tollbooths and on public transit systems, vital statistics, and perhaps even medical records and other biometrics.

It is further object of the invention to be able to track back the instance and exact location of unauthorized use, if at all it happens. It is also another object of the invention to provide optional biometric scanner for live user authentication and verification.

The invention is preferably implemented in a computer having a processor and resident memory, with a modem, an operating system, a graphical user interface, an ODD, such as CD-ROM or. DVD drive, a telephone or cable connection, and an Internet access account. According to the preferred embodiment, there is described a method of conducting a secured transaction by temporarily transforming the ODD device into a hardware card key reader. The method begins with the insertion of the ROCK OD Card in ODD of the personal computer. The ROCK program launches automatically and displays a window, which warns the user that the ROCK will close all programs and processes running in the background in order to secure the user transaction. The user is then asked for his user name and four digit PIN. The 4 digit PIN is encrypted into a 12 digit dynamic PIN using a time-based algorithm. The same algorithm is used at the server to verify and authenticate the 12 digit dynamic PIN. The dynamic PIN changes with every login. Once the user is authenticated he gets access to his preferred network for conducting a secured online transaction. After completing his online transaction, the user logs out of the ROCK application, which ejects the ROCK OD Card from the ODD, and restores the computer and ODD to its normal functionality.

The foregoing discussion summarizes some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, a complete understanding of the invention may be had by referring to the following detailed description of the preferred embodiment.

BRIEF DESCRIPTION OF THE SEVERAL
VIEWS OF THE DRAWINGS

DETAILED DESCRIPTION OF THE INVENTION

Figure 1:
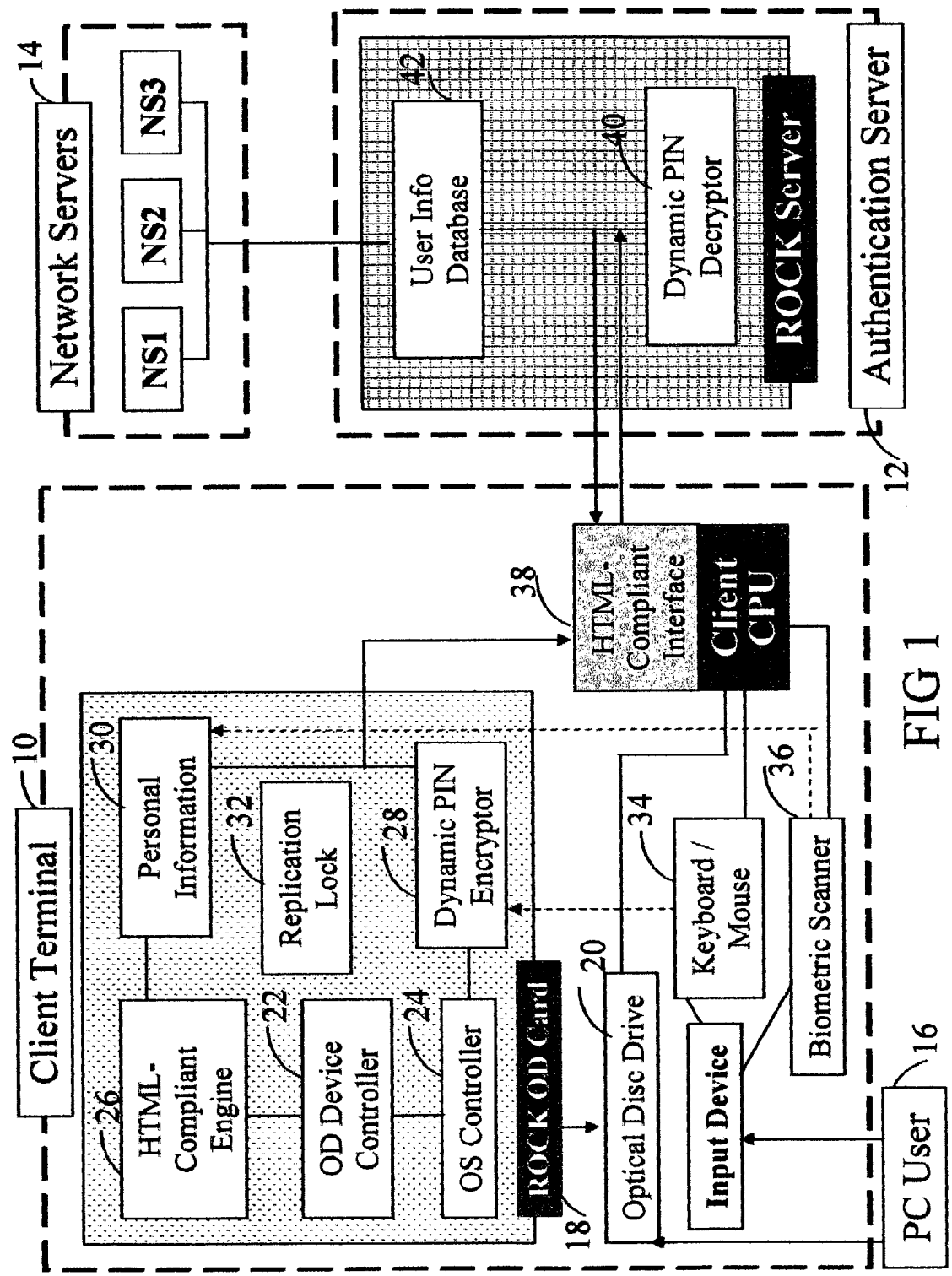
FIG. 1 is a block diagram illustrating the architecture of the ROCK.
Figure 2:
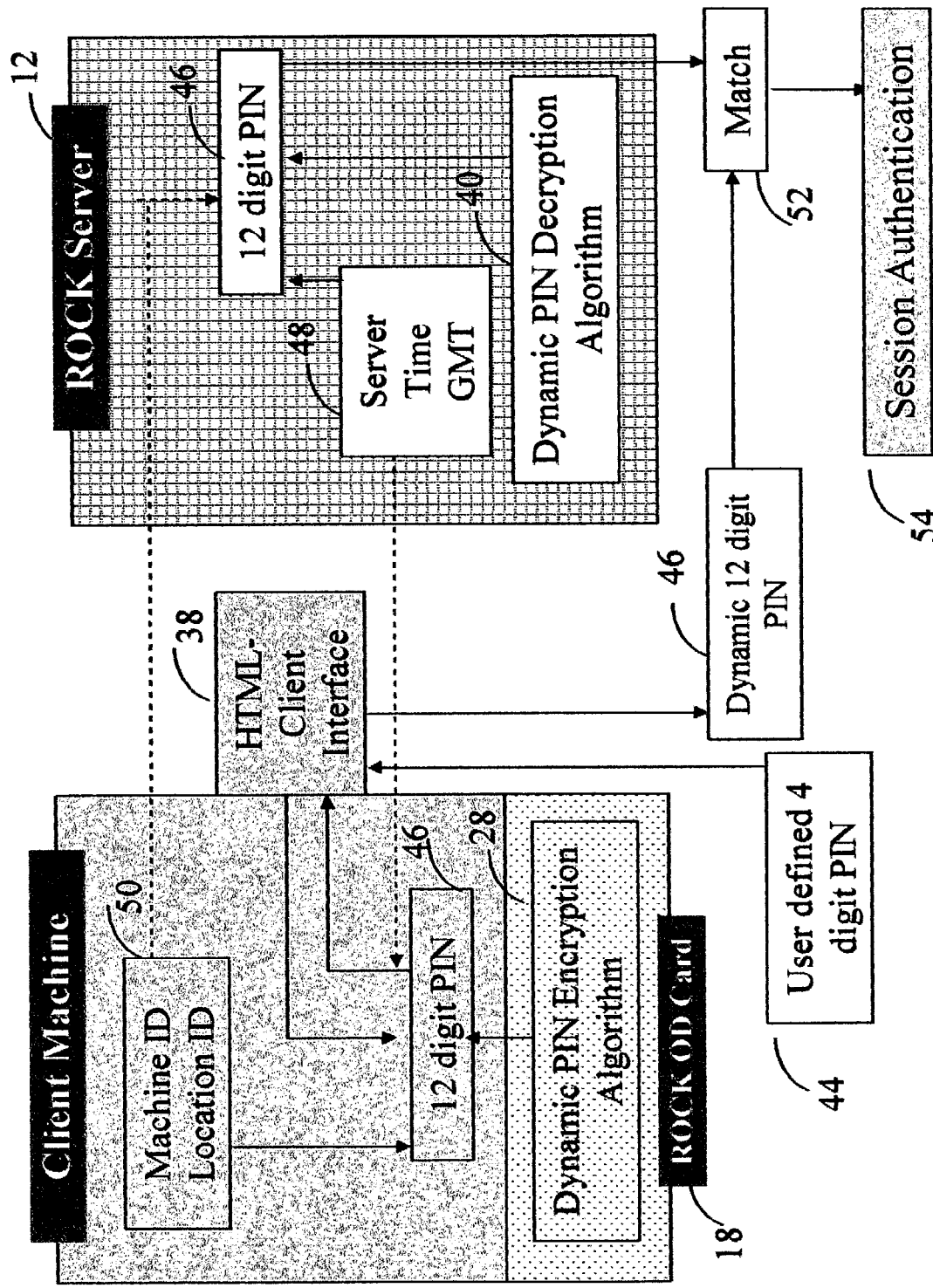
FIG. 2 is a block diagram illustrating the ROCK Dynamic Encryption.

The architecture of the disclosed art is based on the Client-Driven Intelligent Content Delivery platform. The preferred embodiment of the present invention is described as a Client-Server solution for enhancing security of Web transactions.

The preferred embodiment has three functional modules located at three different locations referred herein as nodes. The three Nodes are a) the client terminal 10, b) the authentication server 12, and c) the network servers 14.

The practical implementation of the preferred embodiment begins with the user inserting the ROCK OD Card 18 in the ODD 20 of the client machine (Node 1 Client Terminal 10). The ROCK system uses the following program algorithm modules on the card device and their corresponding remote components on the client and the server.

1. ODD Controller 22 gains control of the CD ROM/DVD functions during the online transaction, by controlling the CD ROM/DVD device drivers. Sets compulsory auto run. Inactivates all user functions such as CD data access, viewing, copying etc. Enables compulsory auto eject after transaction completion and on any illegal command.

2. OS Controller 24 cordons off the ROCK application by closing all programs, applications and hidden processes, to prevent data hijack by spy programs. It also prevents the launch of any concurrent program during the running of ROCK transaction. It thus Isolates the ROCK program from the Operating System, and runs it as a device program from the card.

3. HTML Compliant Engine 26 displays the input and output data. Allows access only to the ROCK defined remote servers, with hidden URL addresses. No trace of the URL address of server pages delivered to the ROCK client left in the client machine.

4. Dynamic PIN Encryptor 28 generates a dynamic 12 digit PIN. The 4 digit PIN is converted into a 12 digit dynamic PIN by the PIN encryption algorithm run from the client card. The dynamic PIN so generated is based on the current standard server time, the IP of the client machine, the card serial number, its exe creation date and the user area code. The PIN Decryptor 40 is located at the server and uses a similar algorithm to decrypt the 12 digit PIN and authenticate the user.

5. Biometric & Personal Information Bank 30—Biometrics, such as photograph, signature, finger print, bank names & account nos. etc may be stored on the card. The details of such card-holder is indexed in databases located at one or more remote servers.

6. ROCK Replication Lock 32—Although ODD Controller prevents the user from viewing, copying or editing the ROCK device data, this module makes it virtually impossible for a hacker to run the copied ROCK device program even if he manages to disable the ODD Controller functionality. The replication lock, works in the following manner. A) The ROCK data on the Optic Disk Card contains a unique virtual ID, which cannot be copied over to any other data storage media. This virtual ID is created while recording the original ROCK data at the time of creating the ROCK Optical Disc Card. Such virtual ID is generated by marking a specific physical location on the ROCK Optical Disc Card by means of a specific bit of data and its absolute location in terms of the precise positioning of the laser beam. In one embodiment this can be done by locating the innermost first data track and the outermost last data track of the ROCK OD Card incongruent with the ISO 9660 standard specifications. These unique marks can be recorded for reference by the subcode channels during the recording session. As these data track markers will not be the same as on any other conventional CD, making a perfect copy will not be possible. B) The ROCK replication lock algorithm checks for such virtual ID before permitting the launch of the ROCK program. If the virtual ID is missing, the ROCK program aborts the launch. In another simpler embodiment the ROCK program checks for information such as date of card creation, number of data tracks etc, before launching the program. Nonconformance to these ROCK OD Card-specific marker data does not allow a duplicate CD to run the program.

7. Optional Biometric scanner & verifier 36—For added extra security the ROCK system can incorporate a real time biometric authentication module. Description of many such biometric authentication systems are known to prior art and available as public domain. Such module can be as simple as a signature pad input device, or much advanced as a finger print or body parts scanning device, for establishing the physical identification of the ROCK user, based on his unique biometric characteristics.

The congregated effect of the above discussed algorithm modules of the ROCK system assigns the following properties to the ODD and ROCK OD Card, which apparently transforms the ODD into a ROCK reading device.

1. The user cannot view the ROCK program files using any conventional ODD.

2. The user cannot copy the ROCK program files from the ROCK OD Card.

3. The user cannot run the ROCK program from any hard drive or any copied Optical Disc other than the original ROCK OD Card 4. The URL address of pages delivered to ROCK application during the transaction are not displayed and permanently erased from all OS and Web browser engine buffers.

5. No program or unknown process is allowed to run concurrently during the ROCK transaction, thereby preventing any spy program from hijacking confidential user data.

6. The 4-digit user PIN is converted to 12-digit dynamic PIN, which changes with every transaction, hence accessing the ROCK server without the ROCK OD Card, even if the hacker cracks the user PIN and URL of the remote server, is virtually impossible, 7. Every unauthorized transaction can be back tracked as the location and the client machine ID is encrypted in the ROCK server database.

In the preferred embodiment the user action is initiated at the client terminal by inserting the ROCK OD Card in the ODD of the client machine and controlling the navigation with the help of the data input devices such as Keyboard or Mouse 34. For a very high level security a biometric scanner 36, such as signature or finger print scanner can be deployed for assuring a fool proof person specific transaction. The program algorithms on the ROCK OD Card are processed by the client CPU and displayed on its HTML compliant interface 38. Through the HTML Compliant interface the ROCK communicates with the ROCK server 12, which runs the dynamic PIN decryption algorithm 40, for user access to the user info database 42, and access to predefined network servers 14.

ROCK Dynamic Encryption

The user enters a 4-digit PIN 44 in a login page displayed in the HTML-compliant interface 38. On submission of the PIN for user authentication, the dynamic PIN encryptor 28 converts the PIN to a 12-digit number 46, which is generated by taking into account the time (GMT from the server) 48 and also the client location and machine ID 50. The dynamic PIN decryptor 40 of the authentication server 12 also generates the same dynamic PIN using the same parameters. Hence the dynamic PIN changes with every login. If the 4 digit PIN is correct the dynamic PIN matches 52 and the user session is authenticated 54.

Figure 3A:
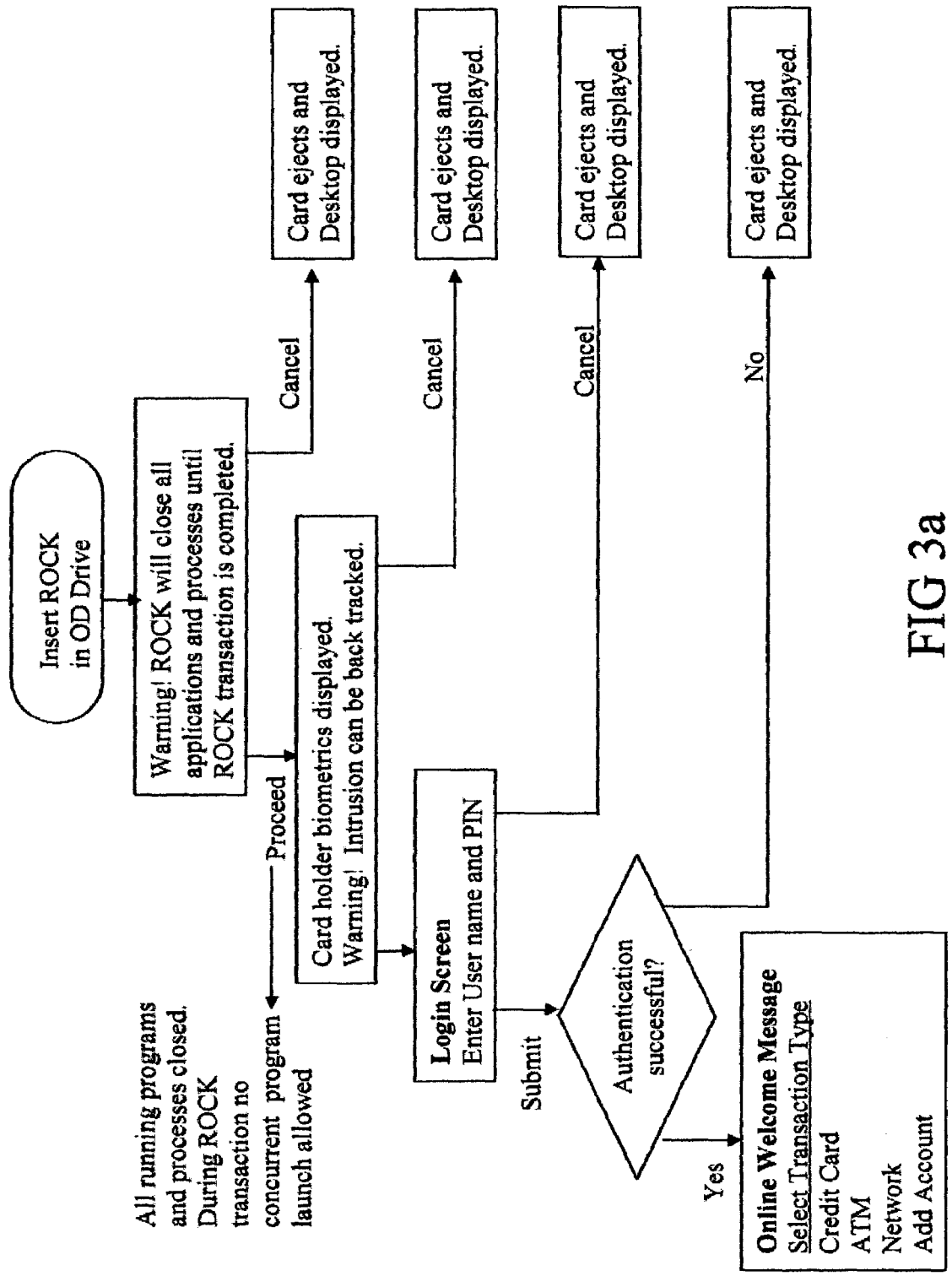
FIGS. 3a and 3b are the navigation screens for completing the ROCK transaction.
Figure 3B:
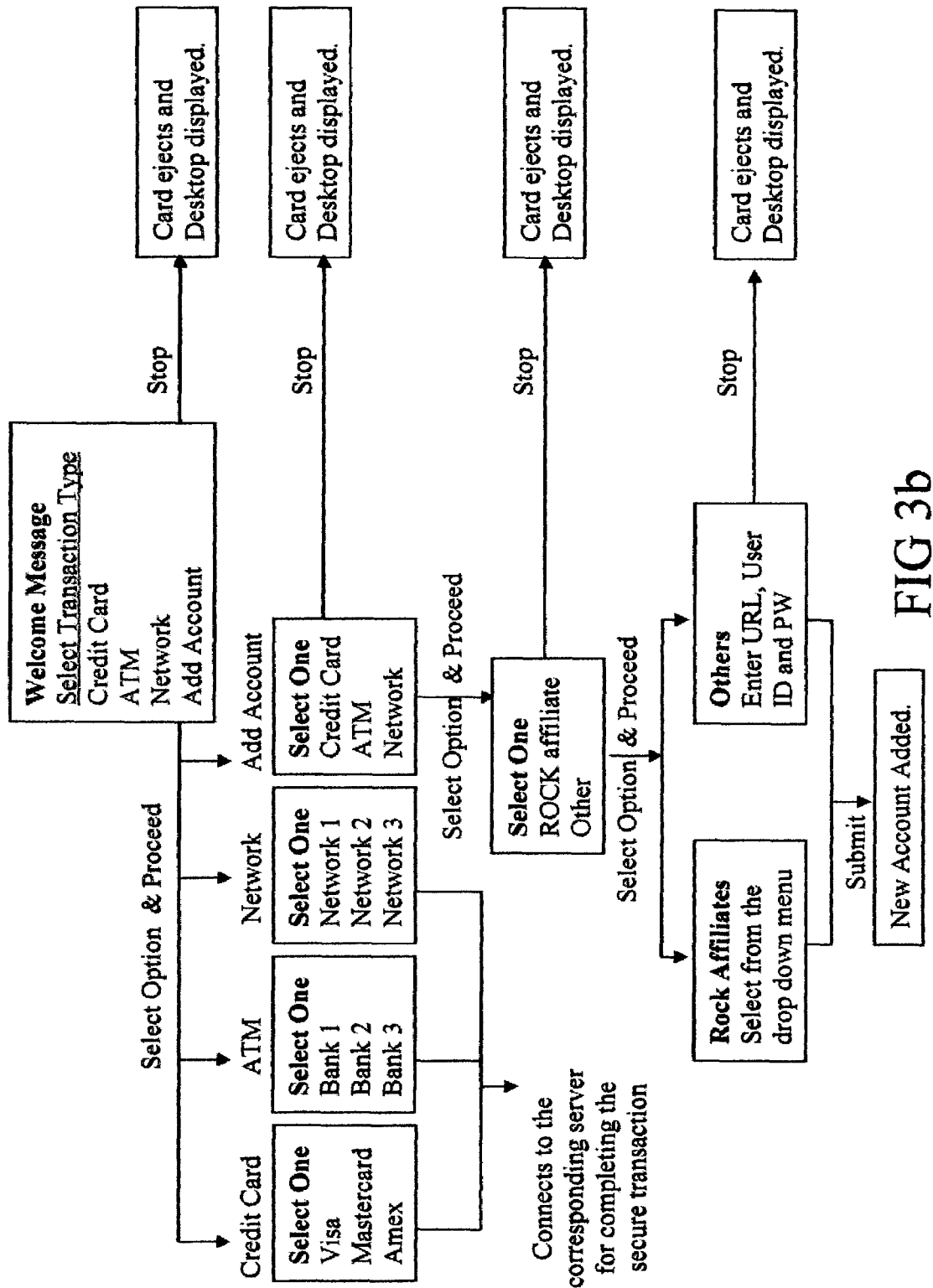
Figure 4:
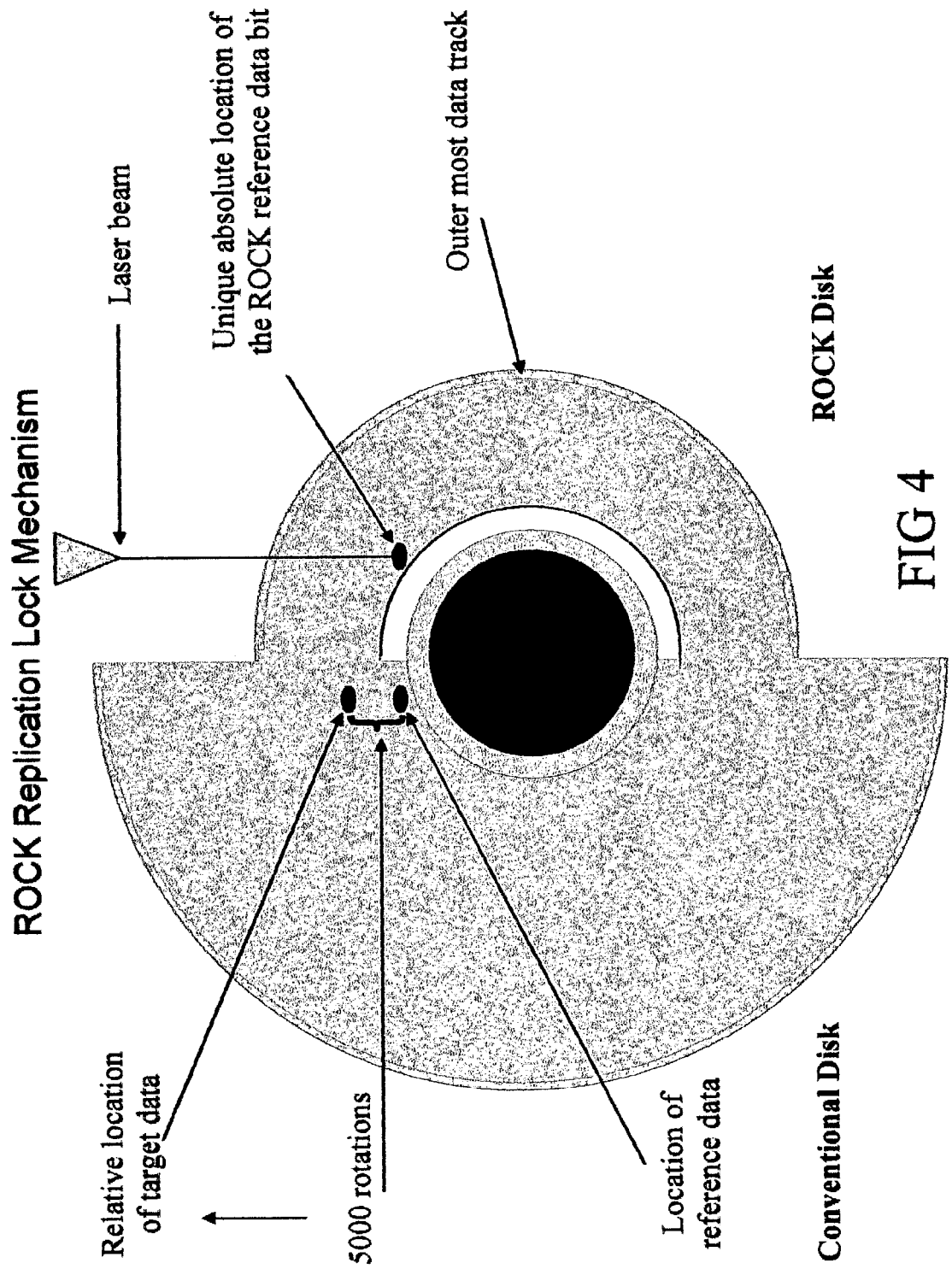
FIG. 4 is a block diagram illustrating the ROCK replication lock mechanism.

FIGS. 3*a* and 3*b* illustrate the flow diagram of practical implementation of the preferred embodiment in terms of user navigation screens after the session is authenticated.

Thus, as illustrated in the above detailed description of the invention and the flow diagrams, an online transaction on the Internet is secured by means of a physical hard key/card, which can universally work in any conventional computer without the need of a special hardware for reading such hard key/card. According to the teachings of the preferred embodiment of the present invention, such hard key/card will virtually eliminate unauthorized access and ensure a high level of security and privacy in all transactions conducted by using such hard key/card. A further feature of the preferred embodiment is the multiple layers of security built into the system, which makes it virtually impossible for a hacker to break in. Even if the hacker is able to crack all the layers including the 4-digit user PIN, and succeeds in reaching the ROCK server without the ROCK OD Card, he will not be able to enter the server because only 12-digit dynamic PIN will be authenticated. Such 12-digit PIN is generated afresh at every new transaction making it impossible to crack the 12-digit dynamic PIN.

In another preferred embodiment of the present invention the security can be further enhanced by deploying biometric scanner for scanning physical characteristics of the user for access authentication. In yet another preferred embodiment the hard key/card is designed as a credit card, wherein the back of such a card has magnetic stripe and manual authentication methods, providing additional authentication methods in addition to ODD based authentication. In yet another embodiment the hard key/card is deployed for authenticating login on to an assigned client computer.

Several embodiments of the present invention are specifically illustrated and described herein. However, it will be appreciated that modifications and variations of the present invention are covered by the above teachings. While the preferred embodiments of the present invention have been illustrated in detail, it should be apparent that modifications and adaptations to those embodiments may occur to one skilled in the art without departing from the scope of the present invention as set forth in the following claims.

The invention claimed is:

1. A method for protecting privacy and confidentiality of a user from client resident spy programs, by means of the use of a shaped optical disc based real online card key (ROCK) removable storage device for conducting secure online client-server transactions comprising of the following client-independent components:
   a. a ROCK-resident optical disc drive controller program that are one or more software drivers that prohibit viewing or copying of the user's personal information stored on the removable storage device (ROCK) and limits operation of the client's optical disc drive from executing the ROCK-resident program files;
   b. a ROCK-resident client OS (operating system) controller program that are one or more software drivers that freeze the client's operating system and all concurrently running programs and processes, and subsequently restores the client OS and such frozen programs and process after completing the secure client-server transaction;
   c. a ROCK-resident HTML-compliant interface
   d. a ROCK-resident biometric personal information file and a dynamic PIN encrypting software; and
   e. a remote transaction server hosting authorized users' personal biometric information bank and the corresponding dynamic PIN decrypting software.

2. The method of claim 1, wherein the removable memory device is a Compact Disk or Digital Video Disk (DVD), and the drive is a CD ROM drive or a DVD drive.

3. The method of claim 1, wherein the ROCK removable memory device temporarily transforms an optical disc drive of a computer into a card reading device suspending the optical disc drive functionalities of viewing or copying the ROCK disk-resident information when the ROCK disk is inserted in the optical disc drive and as long as the ROCK disk remains in the optical disc drive of a client terminal.

4. The method of claim 1 wherein the client OS controller is a thin real time operating system (RTOS) resident on the ROCK device that records the status of the client OS and program files in a snap shot saved to client terminal's volatile memory before freezing them and restores the client terminal to its original state after completing the secure online transaction using ROCK's own RTOS and program files.

5. The method of claim 1 wherein the combined operation of optical disc drive controller and the client OS controller temporarily takes over complete control of the client machine and transforms its optical disc drive into an exclusively a card reading device when the ROCK disc is inserted in the optical disc drive and as long as the ROCK device remains in the optical disc drive.

6. The method of claim 1 wherein the client is a personal computer.

7. The method of claim 1, wherein the ROCK device is designed in the form and size of a conventional credit card, with the ROCK software applications recorded on a reflective side of the shaped disc and conventional magnetic stripe and manual authentication mechanisms on a non-reflective side of the shaped disc.

8. The method of claim 1, wherein the ROCK device is a network access authentication card.

9. The method of claim 1 wherein the dynamic PIN encryptor comprises of an encryption algorithm that generates a new encrypted password string every time the user uses the ROCK disc.

10. The method of claim 1 wherein the remote transaction server comprises of a dynamic PIN decrypting software that deploys a decryption algorithm corresponding to the ROCK resident encrypting software algorithm to decrypt the dynamic PIN generated and encrypted by ROCK at the client terminal.

11. The method of claim 1, wherein an optional biometric scanner module is added for enhanced person-specific access to a protected network.

12. The method of claim 11 wherein the biometric scanner module is a finger print reader.

13. The method of claim 11 wherein the biometric scanner is handwriting reader.

14. The method of claim 11 wherein the biometric scanner is an iris scan reader.

15. The method of claim 1 wherein the client-independent components on the ROCK disc are further secured from unauthorized duplication by implementation of an optical disc replication lock.

* * * * *